United States Patent [19]

Cross

[11] Patent Number: 5,065,700

[45] Date of Patent: Nov. 19, 1991

[54] SHUTTER FOR ANIMAL-WATERING VALVE

[75] Inventor: David L. Cross, Benicia, Calif.

[73] Assignee: Se Lab Group, Inc., Cincinnati, Ohio

[21] Appl. No.: 599,045

[22] Filed: Oct. 17, 1990

[51] Int. Cl.⁵ .............................................. A01K 7/00
[52] U.S. Cl. .................................. 119/725; 251/339; 137/614.11
[58] Field of Search ........................ 119/72.5, 72, 75; 251/339; 137/614.11

[56] References Cited

U.S. PATENT DOCUMENTS

| | | | |
|---|---|---|---|
| 2,939,424 | 6/1960 | Frederiksen | 119/72.5 |
| 3,550,560 | 12/1970 | Edstrom | 119/72.5 |
| 4,006,716 | 2/1977 | Cross | 119/72.5 |
| 4,187,804 | 2/1980 | von Taschitzki | 119/72.5 |
| 4,320,891 | 2/1982 | Cairns | 251/332 |
| 4,338,884 | 7/1982 | Atchley et al. | 119/72.5 |
| 4,402,343 | 9/1983 | Thompson | 137/614.2 |
| 4,406,253 | 9/1983 | Atchley et al. | 119/72.5 |

Primary Examiner—Gene Mancene
Assistant Examiner—Thomas Price
Attorney, Agent, or Firm—James R. Cypher

[57] ABSTRACT

A shutter assembly for an animal-watering valve which is operable by a small animal moving a lever arm from side to side. The primary purpose of the shutter is to prevent the animal from stuffing material between the lever arm and the water passage and thereby render the valve inoperable i.e. in a full on, full off or leaking mode. The shutter includes a disc mounted on the lever arm which substantially covers the annular opening between the lever arm and the water passage formed in the valve housing. To insure operablility of the valve at elevated water pressures, a pressure equalization chamber may be formed in the valve to equalize the water pressure on the shutter when the valve is in the closed position.

7 Claims, 3 Drawing Sheets

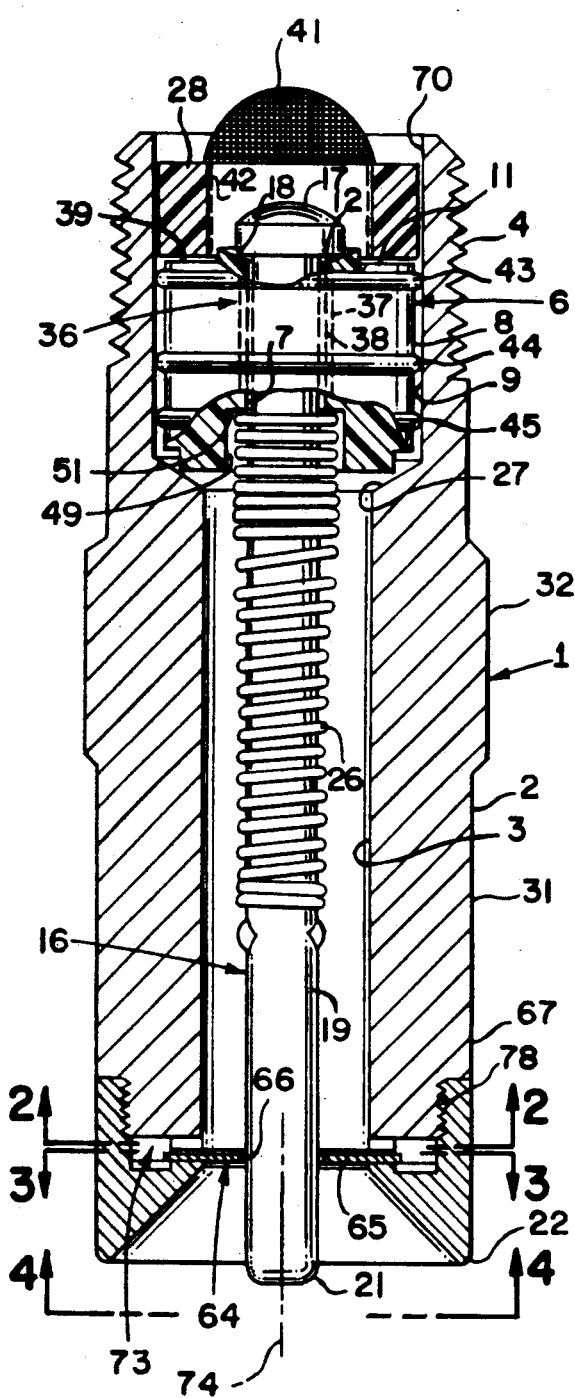

SHUTTER FOR ANIMAL-WATERING VALVE

This invention relates to animal actuated watering valves.

BACKGROUND OF THE INVENTION

Animal actuated watering valves such as Miniature Animal-Watering Valve, Cross, U.S. Pat. No. 4,006,716, Feb. 8, 1977 have been in use for many years. The Cross valve consists of a housing connected to a water supply source and the valve is operated by the animal moving a lever from side to side within a passage through which the water exits. Many animals have an inborn trait to stuff material into all openings. This trait results in the animal stuffing bedding material, hair or any other available material into the valve opening thus preventing the lever from moving from side to side. Foreign material in the valve can result in the animal cutting off its water supply, or causing the valve to stick in an open position so as to result in a steady stream thereby flooding the cage and in some cases drowning the animal, or the valve may simply leak.

After the experiment is completed and the animal removed, the cages are often washed by a steady stream of high pressure hot water or steam, and this can result in bedding material and other foreign material being forced into the valve opening. If the cage and valve are dried with intense heat, the foreign material inside the valve is baked to a very hard mass.

SUMMARY OF THE INVENTION

The gist of the present invention is the use of a shutter surrounding the valve lever which closes the opening between the lever and the passage through the valve housing when the valve is in the closed position. The shutter prevents the animal from stuffing material into the valve opening and thus the valve remains operable by the animal.

BRIEF DESCRIPTION OF THE DRAWINGS

FIG. 1 is a cross sectional view of a valve such as the one shown in FIG. 9 which has been modified in accordance with the present invention.

FIG. 2 is a cross sectional view of the valve shown in FIG. 1 taken along line 2—2.

FIG. 3 is a cross sectional view of the valve shown in FIG. 1 taken along line 2—2.

FIG. 4 is an end view of the valve shown in FIG. 1 taken in the direction of the arrows on line 4—4.

BRIEF DESCRIPTION OF THE PREFERRED EMBODIMENT

Figures 5, 6:
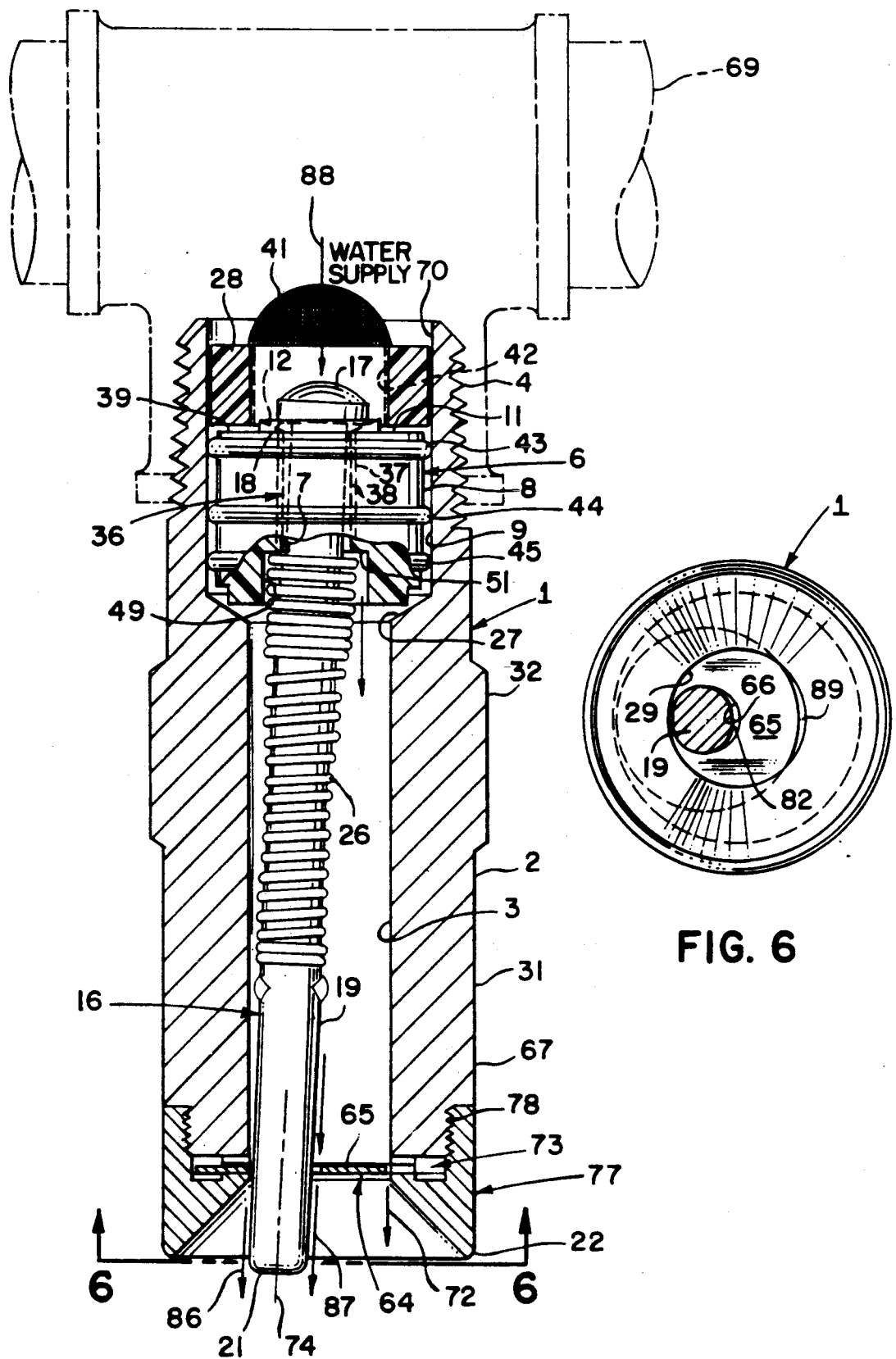
FIG. 5 is a cross sectional view of the valve shown in FIG. 1 with the parts illustrated in the open position of the valve. The phantom line illustrates a typical header pipe containing a water supply.
FIG. 6 is an end view of the valve shown in FIG. 5 taken in the direction of the arrows on line 6—6.
Figure 7:
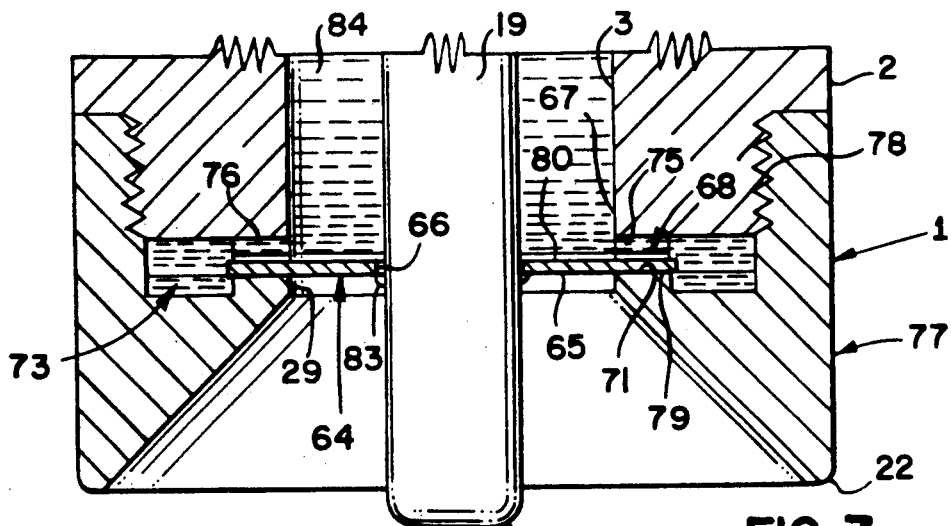
FIG. 7 is an enlarged cross sectional view of a portion of the distal end of the valve illustrated in FIG. 1.
Figure 8:
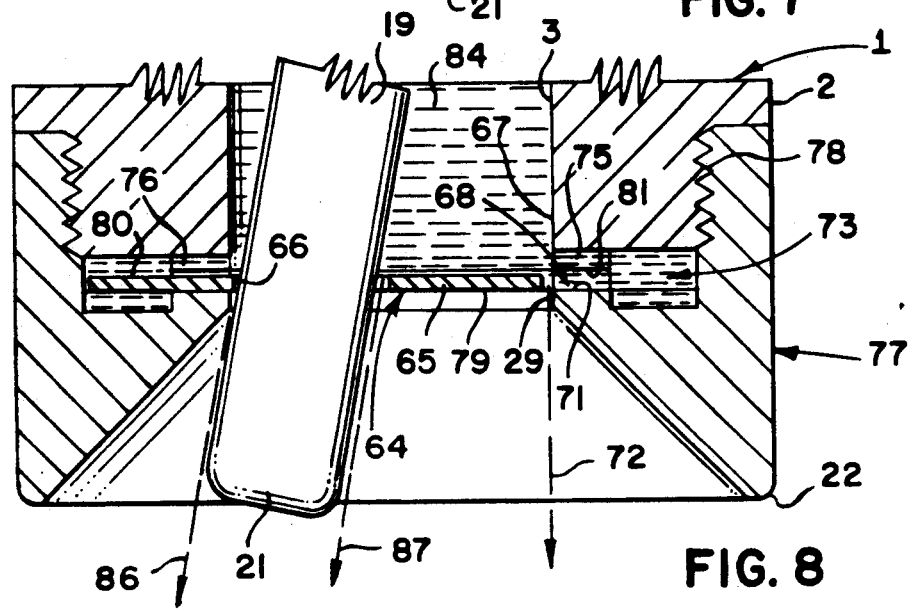
FIG. 8 is an enlarged cross sectional view of a portion of the distal end of the valve illustrated in FIG. 5.
Figure 9:
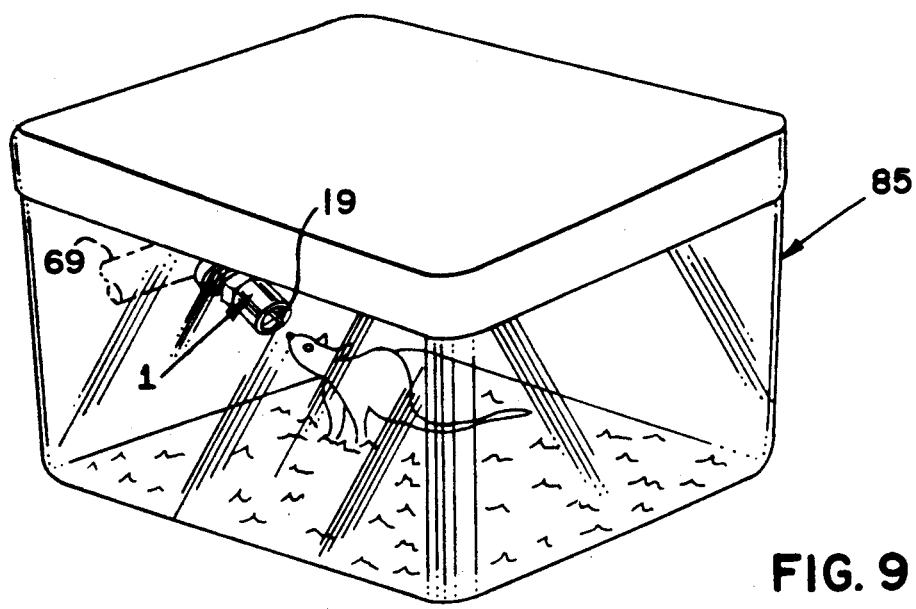
FIG. 9 is a perspective view of the valve illustrated in the previous views with a small animal enclosed in a cage operating a valve as modified in accordance with the present invention.

The shutter assembly 64 of the present invention is for an animal-watering valve 1 which includes a valve housing 2, a cylindrical passage 3 formed therein, a valve lever arm 19 mounted in the cylindrical passage for pivotal movement between a valve closed centered position as illustrated in FIGS. 1 and 7 and a valve open radially displaced position as illustrated in FIGS. 5 and 8, and biasing means 26 engaging the valve lever arm 19 for centering the valve lever arm within the cylindrical passage 3. The shutter assembly 64 includes: a disc shaped shutter member 65 formed with a center opening 66 for permitting passage of the valve lever arm 19 therethrough; the distal portion 67 of the valve housing 2 is formed with an annular slide chamber 68 having a width dimensioned for receiving the shutter member 65 therein and having a diameter dimensioned for receiving an additional portion of the shutter member 65 when the valve lever arm 19 is in the valve open position. Cylindrical passage 3 has an upstream end which joins shoulder 27 in valve housing 2 and a downstream end which terminates at proximal wall 81 of slide chamber 68.

The shutter assembly 64 of the present invention may be adapted to any animal-watering valve which is activated by an animal moving a lever from side to side to open the valve. A valve which is especially suitable for use with the present invention is Cross U.S. Pat. No. 4,006,716, parts of which are illustrated in the drawing and further described as follows. The valve is formed with pipe threads 4 so that the valve can be adapted for connection to a water supply such as a manifold pipe 69. The valve includes a cylindrical valve seal member 6 having a passage 7 therethrough and the seal member 6 has an outside wall 8 dimensioned to sealably engage the inner wall 9 of cylindrical bore 70 in the valve housing. Seal member 6 illustrated in FIG. 5 is identical to seal member 6 illustrated in FIG. 3 of my U.S. Pat. No. 4,006,716. The upstream end 11 of the seal member 6 is formed with an inwardly sloping conical surface 12. A valve head member 17 formed with an annular small radius outer edge 18 is positioned for "line-point" contact with the sloping conical surface 12 of the valve seal member 6. Lever arm 19 extends from the head member 17 axially through the housing passage and is spaced from the inside wall and extends to a rounded end 21 slightly beyond the distal end 22 of the valve. Biasing means, such as a spring 26 mounted in the housing and engaging the lever arm 19 centers the valve lever arm 19. Means such as a shoulder 27 formed in the housing and a retainer sleeve 28 hold the valve seal member 6 in a fixed position within the housing.

The valve housing is preferably made of stainless steel to provide a hard surface which animals cannot easily damage with their teeth and which will not rust. The cylindrical passage 3 is preferably dimensioned so that lever arm 19 can move with a 360° radial movement by pivoting about its head member 17. The inside land surface 29 serves as a stop surface to limit the movement of the lever arm 19. FIG. 8 illustrates the lever arm 19 at the open position and the closed position is shown in in FIG. 7.

The housing is formed with a smooth outer wall surface 31 for animals that place their lips around the valve end. The outer housing is also may be formed with a hexagonally-faced portion 32 so that the valve can be threadably inserted into a pipe manifold 69 with a wrench.

The valve seal member 6 is preferably made from a durable, autoclavable synthetic nontoxic elastomer such as rubber. The properties of the valve seal member 6 must be carefully chosen so that the member will form a water seal with the inside wall of the housing yet at the same time, the inwardly sloping conical surface 12 will be sufficiently rigid at that the metal valve head member 17 will not completely compress and flatten the curved or sloping surface 12.

Referring, again, to the valve seal member 6, a portion 36 is formed with a symmetrical spline pattern consisting of alternating elongated grooves 37 and ridges 38 in touching contact with lever arm 19 which assist the spring 26 in returning lever arm 19 to a centered position. Deflection of the lever arm 19 to the open position, compresses half the ridges 38. The valve seal member 6 is formed with an annular land 39 adjacent its outer circumference for receiving the retainer sleeve 28. A debris screen 41 should also be used and the screen rim 42 may also rest on the annular land 39. The valve seal member may be formed with a plurality of axially spaced annular curved protrusions 43, 44, and 45 for sealably engaging the inner wall of the housing. The downstream end of the valve seal member 6 is formed with an enlarged opening 49 so as to form a land 51 for receiving the end of centering spring 26.

Referring now to the shutter assembly 64 specifically, wherein the annular slide chamber 68 has a distal annular wall 71, the shutter member 65 is slidably mounted on the valve lever arm 19 and movable from a sealed position in engagement with the distal annular wall 71 of the annular slide chamber 68 when the valve lever arm 19 is in the valve closed centered position and a partially non-sealed position when the valve lever arm 19 is in a valve open radially displaced position. In a preferred form, as illustrated in FIGS. 6 and 8, an edge of shutter member 65 actually clears the wall of cylindrical passage 3 and water is free to flow through the opening as illustrated by arrow 72.

One of the advantages of the use of a shutter as illustrated and described in the present invention is that the shutter holds water in the cylindrical passage at all times. The shutter does not completely seal the valve and water 83 bulges through the opening between the lever arm 19 and the center opening 66 which has a slightly larger diameter than the diameter of the lever arm 19. This is an advantage as most animals can smell the presence of water and thus are attracted to nibble or bite at the lever arm 19 in order to get at the water. This of course activates the valve and in time the animal learns to move the lever arm when it wants to drink water. The fact that the passage 3 is always full of water 84 provides instant water to the animal upon actuation of the lever member 16 and tends to make the flow of water more even instead of a sudden surge of water hitting the mouth of the animal.

The fact that the cylindrical passage 3 is always full of water created a problem which Applicant became aware of through experimentation. The problem is this. Water pressure in cylindrical passage 3 forces shutter member 65 against distal annular wall 71 of annular slide chamber 68. This causes frictional pressure to occur between the shutter member 65 and distal annular wall 71. This frictional pressure increases with an increase in water pressure. Above certain water pressures which are sometimes present in the water supply system, it was found that weak mice that were ill or tiny weanling mice did not have the strength to move the lever arm 19. Attempts were made to smooth the surfaces without success. Applicant then coated the surfaces with various materials and this helped, but did not solve the problem in all cases.

The answer to the problem lay in forming a pressure equalization chamber 73 in the valve housing at a selected radial distance from the central axis 74 with a width which is greater than the width of the annular slide chamber 68 on both sides of the shutter member 65. In addition, the shutter member 65 has a diameter dimensioned to extend into a portion of the pressure equalization chamber when the valve lever arm is in the valve closed centered position. This geometric positioning and dimensioning enables water pressure to exert forces on both sides of the outer annular perimeter of the shutter member 65.

To insure that the pressure in the pressure equalization chamber 73 is established quickly, one or more pressure relief passages 75 and 76 may be formed in the valve housing for connecting the cylindrical passage 3 and the pressure equalization chamber 73.

Applicant found that even though the shutter member 65 was made of stainless steel, minerals in the water and sometimes merely the presence of moisture on a new valve could cause sticking because of the adhesion between the shutter member 65 and the distal annular wall 71 of annular slide chamber 68. Substituting a teflon shutter member 65 cured the adhesion problem. Because it is extremely difficult to obtain teflon shutters, applicant had stainless steel shutters coated with teflon. These coated shutter members worked very well. The coated shutter members have an "orange peel" type surface which seems to work well because it tends to stay lubricated with water because the imperfection of the surface coating tends to break up the smoothness of the surface.

One of the embodiments of the present invention is for use in a valve which has a total length of about 1¼" and a diameter of about 0.43". Such a valve may used with weanling mice.

One of the uses of the present valve is in cages 85 which are completely sealed providing a completely controlled environment for the animal. Once the valve is closed, all air and water to the cage is strictly monitored. In a sealed cage, it may be seen that any leakage or sticking of the valve in either the on or off position can cause the experiment to be aborted and in a worst case the animal can be drowned. For this reason, dependable operation of the valve by the animal alone without interference by laboratory technicians is paramount.

Pressure in the valve may vary from about 2 p.s.i. which provides a fast drip when the valve is opened to 12 p.s.i. which provides a gentle steady stream. At times, pressure exceeds 16 p.s.i. and it is above this pressure that it is essential that the pressure equalization chamber 73 be incorporated in the valve structure.

Preferably the valve is constructed in two major parts as illustrated in the drawings. The body of the valve is indicated generally by the number 2 and means adapted for attachment to the valve 2 such as a nose piece is indicated generally by the number 77. The two parts are joined by providing threads 78. The nose piece 7 positions the disc shaped shutter member 65 adjacent the downstream end of the cylindrical passage 3 when the valve lever member 16 is in the closed centered position.

Operation of the shutter member and the valve is as follows. When the valve is closed with valve lever member 16 in the centered position as shown in FIG. 1, valve head member 17 is centered on inwardly sloping conical surface 12 of valve seal member 6 and no water can pass the valve seal member 6. Shutter member 65 is generally centered about central axis 74 and the distal face 79 of shutter member 65 is in sealing engagement with distal annular wall 71 of annular slide chamber 68. In the off position of the valve, a small bulge of water 83 will almost always occur between the outer edge of lever arm 19 and the center opening 66 of shutter member 65. The cylinder passage 3 is full of water in the valve closed position. Spring biasing means 26 maintains the lever arm 19 in the centered position with the assistance of the valve seal member 6 as previously described.

The small animal is attracted to the valve by the bulge of water 83 at the center opening of the shutter. Most animals can actually smell the water and if they are thirsty they will attempt to get at the water. The valve is operated by the animal by placing its tongue, teeth, or nose against rounded end 21 of lever arm 19 and pushing it to an off center position. Movement of the end of lever arm 19 causes outer edge 18 of valve head member 17 to lift partially off inwardly sloping conical surface 12 of valve seal member 6 and permit passage of water between the elongated grooves 37 and elongated ridges 38 of valve seal member 6 and into cylindrical passage 3, pushing water already in the cylindrical passage through the opening between lever arm 19 and center opening 66 in shutter member 65.

As lever arm 19 is moved further from the center position, water moves through pressure relief passage 75 and between the proximal side 80 of shutter member 65 and the proximal wall 81 of annular slide chamber 68 into pressure equalization chamber 73. As the seal between shutter member 65 and distal annular wall 71 of annular slide chamber 68 is broken water begins to flow from the manifold pipe as indicated by arrow 88 and between the distal face 79 of shutter member 65 and distal annular wall 71 of annular slide chamber 68. As the animal continues to move lever arm 19 away from a centered position, the outside edge of shutter member 65 actually clears the annular land 29 and a direct supply of water moves from the cylindrical passage 3 past the edge of the shutter member 65 as indicated by arrow 72. As shown in FIG. 6 a crescent shaped opening 82 forms to permit increased flow of water. In the fully opened position, an edge of lever arm 19 touches annular land 29 thereby serving as a stop and preventing further opening of the valve. Water exits the valve as indicated by arrows 86 and 87.

Once the lever arm is in the fully opened position and if the animal keeps the lever arm 19 in the fully opened position, shutter member 65 will frequently return to its original position with its distal face 79 against distal annular wall 71 of annular slide chamber 68. At the same time, the outer edge of the shutter member 65 will have moved into pressure equalization chamber 73 so that a larger area of the shutter member will be subject to equal pressure on both sides. This reduces the water pressure which is working to keep the shutter 65 in contact with distal annular wall 71 of annular the slide chamber 68 and permits spring 26 to return valve lever member 16 and lever arm 19 to the centered position coaxially with axis 74 when the animal lets go of the end 21 of lever arm 19. As long as any water is flowing from the valve past shutter member 65, water will flow through pressure relief passages 75 and 76 to keep equal pressure on both sides of portions of shutter member 65 which extend into the pressure equalization chamber 73.

FIG. 6 illustrates the position of the shutter 65 in the fully open position. Note that a crescent shaped opening 89 is formed through which water exits as indicated by arrow 72 on FIG. 5.

I claim:

1. A shutter assembly in combination with an animal-watering valve which includes a valve housing having a distal portion, a cylindrical passage formed therein having an upstream end and a downstream end, a valve lever arm having no passage for water there through mounted in said cylindrical passage for pivotal movement between a valve closed centered position and a valve open radially displaced position dimensioned to permit flow of water between said valve lever arm and said cylindrical passage, biasing means engaging said valve lever arm for centering said valve lever arm within said cylindrical passage, and said shutter assembly comprising:
   a. a movable disc shaped shutter member having an outer periphery which surrounds said valve lever arm and non sealably substantially covers said cylindrical passage when said valve lever arm is in said closed centered position for preventing an animal from stuffing material into said cylindrical passage; and
   b. means adapted for attachment to said valve for positioning said disc shaped shutter member adjacent said downstream end of said cylindrical passage when said valve lever is in said closed centered position and permitting flow past said disc shaped shutter member when said valve lever arm is in said valve open radially displaced position.

2. A shutter assembly as described in claim 1 comprising:
   a. said disc shaped shutter member is formed with a center opening which permits passage of said valve lever arm therethrough;
   b. said distal portion of said valve housing is formed with an annular slide chamber having a width which receives said shutter member therein and has a diameter dimension which receives an additional portion of said shutter member when said valve lever arm is in said valve open position permitting flow between a portion of said outer periphery of said disc shaped shutter member and said cylindrical passage.

3. A shutter assembly as described in claim 2 wherein said annular slide chamber has a distal annular wall; comprising:
   a. said shutter member is slidably mounted on said valve lever arm and movably from a sealed position in engagement with said distal annular wall of said annular slide chamber when said valve lever arm is in said valve closed centered position and a partially non-sealed position when said valve lever arm is in a valve open radially displaced position.

4. A shutter assembly as described in claim 3 wherein said valve housing has a central axis and said cylindrical passage is coaxially located on said central axis comprising:
   a. said annular slide chamber in said valve housing at a selected radial distance from said central axis has a width which is broadened on both sides of said shutter member forming a pressure equalization chamber;

b. said shutter member has a diameter dimensioned to extend into a portion of said pressure equalization chamber when said valve lever arm is in said valve closed centered position 5. A shutter assembly as described in claim 4 comprising:

a. a pressure relief passage formed in said valve housing adapted for connecting said cylindrical passage and said pressure equalization chamber for rapidly equalizing the water pressure in said cylindrical passage and said pressure equalization chamber.

6. A shutter assembly as described in claim 5 wherein:

a. said shutter member is constructed to provide a self lubricating surface to prevent adhesion between said shutter member and said distal annular wall of said annular slide chamber.

7. A shutter assembly as described in claim 5 wherein:

a. said shutter member is constructed from stainless steel and coated to provide a self lubricating surface to prevent adhesion between said shutter member and said distal annular wall of said annular slide chamber.

* * * * *